US007060231B2

(12) United States Patent
Cho et al.

(10) Patent No.: US 7,060,231 B2
(45) Date of Patent: Jun. 13, 2006

(54) PLASMA REACTOR HAVING REGIONS OF ACTIVE AND PASSIVE ELECTRIC FIELD

(75) Inventors: Byong K. Cho, Rochester Hills, MI (US); Se H. Oh, Troy, MI (US); Steven J. Schmieg, Troy, MI (US)

(73) Assignee: General Motors Corporation, Detroit, MI (US)

( * ) Notice: Subject to any disclaimer, the term of this patent is extended or adjusted under 35 U.S.C. 154(b) by 260 days.

(21) Appl. No.: 10/269,235

(22) Filed: Oct. 11, 2002

(65) Prior Publication Data

US 2004/0000476 A1 Jan. 1, 2004

Related U.S. Application Data

(63) Continuation-in-part of application No. 10/186,393, filed on Jun. 27, 2002, now abandoned.

(51) Int. Cl.
*B01J 19/08* (2006.01)
*C01B 21/00* (2006.01)

(52) U.S. Cl. .................. 422/186.04; 204/177; 204/179; 423/235

(58) Field of Classification Search ............ 422/186.04; 204/177, 179; 423/235
See application file for complete search history.

(56) References Cited

U.S. PATENT DOCUMENTS

| | | | |
|---|---|---|---|
| 5,746,984 A | 5/1998 | Hoard ......................... | 422/169 |
| 5,855,855 A * | 1/1999 | Williamson et al. ... | 422/186.04 |
| 6,176,078 B1 | 1/2001 | Balko et al. ................... | 60/274 |
| 6,264,899 B1 | 7/2001 | Caren et al. ............. | 422/186.3 |
| 6,357,223 B1 | 3/2002 | Caren et al. .................. | 60/274 |
| 6,560,958 B1 | 5/2003 | Bromberg et al. ............ | 60/275 |

OTHER PUBLICATIONS

Pending U.S. Appl. No. 10/313,311, Cho et al.
"Comparison of Electrical Discharge Techniques for Non-thermal Plasma Processing of NO in $N_2$"to IEEE, V. 23, No. 4, p. 679 (Aug. 1995).
"Plasma Enhanced Selective Catalytic Reduction: Kinetics of $NO_x$ Removal and Byproduct Formation", SAE Publication 1999–01–3632 (1999).
"Diesel $NO_x$ Reduction on Surfaces in Plasma", SAE Publication 982511 (1998).
"Vehicle Exhaust Treatment Using Electrical Discharge Methods", SAE Publication 971716 (1997).

* cited by examiner

*Primary Examiner*—Steven VerSteeg
(74) *Attorney, Agent, or Firm*—Kathryn A. Marra

(57) ABSTRACT

A plasma reactor for automotive exhaust gas applications which efficiently promotes diffusion, mass transfer and chemical reaction processes of atoms, ions and radicals, in that the ground (outer) electrode has an axially discrete pattern which provides alternating regions of active and passive electric field along the axial direction of the plasma reactor. As the exhaust gas passes axially along the plasma reactor, each active region produces plasma atoms, ions and radicals, which then have time to react with the $NO_x$ over the course of the adjacent passive region. In this manner, successive active regions produce copious atoms, radicals and ions, and the adjacent passive regions provide time for these radicals and ions to react with the $NO_x$ and hydrocarbons before the next active region is encountered by the moving stream of exhaust gas, thereby enhancing the performance of the plasma reactor.

18 Claims, 5 Drawing Sheets

US 7,060,231 B2

PLASMA REACTOR HAVING REGIONS OF ACTIVE AND PASSIVE ELECTRIC FIELD

CROSS-REFERENCE TO RELATED APPLICATIONS

The present application is a continuation-in-part of patent application Ser. No. 10/186,393, filed on Jun. 27, 2002, now abandoned.

TECHNICAL FIELD

The present invention relates to plasma reactors used to reduce $NO_x$ of internal combustion engine exhaust, and more particularly to a plasma reactor having nonuniform electric fields consisting of regions of active and passive electric field along its length.

BACKGROUND OF THE INVENTION

The removal of nitrogen oxides ($NO_x$) from internal combustion exhaust is an increasing concern, especially for lean-burn engines such as direct injection gasoline engines and Diesel engines. One method for post combustion $NO_x$ removal is the subjection of the exhaust gases to a non-thermal plasma process. In this regard, the exhaust gas is passed through a plasma processing tube whereat a high voltage electric field imparts formation of a plasma. The plasma has a large number of energetic electrons which collide with exhaust gas molecules to form atoms, ions and radicals. These atoms, ions and radicals, in turn, react either with the NO to make $NO_2$, or with hydrocarbons to produce aldehydes. The produced aldehhydes subsequently reduce $NO_2$ over suitable catalysts to make harmless nitrogen. Thus, the major role of the plasma reactor is to produce $NO_2$ from NO and aldehydes from hydrocarbons in the combustion exhaust stream. Among the aldehydes produced in the plasma reactor, acetaldehyde ($CH_3CHO$) is known to be the most effective for $NO_2$ reduction over alkali-based catalysts.

FIGS. 1A through 1C depict three prior plasma reactors, wherein the external high voltage source is either pulsating D.C. or A.C.

FIG. 1A depicts a first form of plasma reactor 10, referred to commonly as a pulsed corona discharge plasma reactor, in which a conductive metallic tube 12 defines the reactor wall 14, and inside of which exhaust gas G passes along. Axially along the concentric center of the tube 12 is a conductive high voltage electrode rod 16. The central electrode rod 16 is electrified by an external high voltage source with the tube 12 serving as the ground electrode, wherein a corona is formed therebetween without sparking which induces plasma formation of the exhaust gas.

FIG. 1B depicts a second form of plasma reactor 10', referred to commonly as a dielectric barrier discharge plasma reactor, in which a conductive metallic tube 22 and an insular dielectric layer 24, which is concentrically disposed at the inside surface of the tube collectively define the reactor wall 26. As in the first form of plasma reactor 10, exhaust gas G passes along the interior of the reactor wall 26, and a conductive high voltage electrode rod 28 is located axially along the concentric center of the tube 22. The central electrode rod 28 is electrified by an external high voltage source with the tube 22 serving as the ground electrode, wherein the dielectric layer 24 becomes polarized. The polarization of the dielectric layer 24 stores energy which serves to aid the inducement of the plasma formation of the exhaust gas without sparking.

FIG. 1C depicts a third form of plasma reactor 10", commonly referred to as a dielectric packed-bed discharge plasma reactor, in which, as in the second form of plasma reactor 10', a conductive metallic tube 32 and an insular dielectric layer 34, which is concentrically disposed at the inside surface of the tube, collectively define the reactor wall 36, wherein exhaust gas G passes along the interior of the reactor wall 36, and a conductive high voltage electrode rod 38 is located axially along the concentric center of the tube 32. A plurality of small insular dielectric pellets 40 loosely fill the interior of the reactor wall 36 such that the exhaust gas G is easily able to travel through the spaces therebetween. The central electrode rod 38 is electrified by an external high voltage source with the tube 32 serving as the ground electrode, wherein the dielectric layer 34 becomes polarized, and each of the pellets 40 becomes locally polarized, as well. The polarization of the dielectric layer 34 and of the local polarization of the pellets 40 store energy which serves to aid the inducement of the plasma formation of the exhaust gas without sparking.

In the prior art, the plasma reactor wall may have either a flat or cylindrical geometry, and the electrodes are typically made of continuous electrical conductors, so that a uniformly active electrical field is formed in the air gap therebetween to generate a plasma of maximum intensity for a given voltage. Prior art plasma reactors emphasize production of a high intensity plasma based on an implicit assumption that the plasma intensity is the limiting factor of the underlying process. The continuous electrodes utilized in the prior art plasma reactors may be suitable for operating conditions where the supply of high energy electrons is the rate limiting step of the plasma reaction. However, when the rate limiting step is other than the electron supply, an increase in input energy above a certain value through the continuous electrodes will hardly improve the overall performance of the plasma process.

The inventors of the present invention, while investigating plasma assisted lean $NO_x$ catalysis, have discovered that the limiting factor of the plasma reaction process is not the intensity of the plasma but the diffusion, mass transfer and chemical reaction of intermediates (such as atoms, ions and radicals) produced in the plasma under the operating conditions of a typical automotive engine exhaust gas stream. Thus, it is important to promote the diffusion, mass transfer and chemical reaction processes of atoms, ions and radicals in the plasma reactor in order to improve the overall performance of the $NO_x$ reduction process in the engine exhaust. In this regard, it is noted that energy is invested in the dielectric layer of prior art plasma reactors without an efficient pay-out with respect to the plasma energy in terms of encouraging maximal reaction of the atoms, ions and radicals with respect to the $NO_x$ and hydrocarbons.

Accordingly, what remains needed in the art of plasma reactors is to somehow provide an operative configuration which efficiently promotes diffusion, mass transfer and chemical reaction processes of atoms, ions and radicals in a plasma generator for automotive exhaust gas applications.

SUMMARY OF THE INVENTION

During a study by the inventors hereof of plasma assisted lean $NO_x$ catalysis using simulated engine exhaust gases, identified was the mass transfer/chemical reaction rate of ionized reactant species (not the electron supply) as the rate limiting step of the plasma process under typical operating conditions. It is the present inventors' discovery that an increase of mass transfer/chemical reaction rate of the ionized reactants can be achieved by arranging the ground electrode in discrete locations along the axial length of the plasma reactor, which thereby provides passive regions therebetween serving as effective mass transfer/chemical reaction areas.

The present invention is a plasma reactor for automotive exhaust gas applications which efficiently promotes diffusion, mass transfer and chemical reaction processes of ions and radicals, in that the ground (outer) electrode has an axially discrete pattern, as for example a spiral pattern, which provides alternating regions of active and passive electric field. As the exhaust gas passes axially along the plasma reactor, each active region produces atoms, ions and radicals due to the plasma reaction, which then have time to react with the $NO_x$ and hydrocarbons over the course of the adjacent passive region. In this manner, successive active regions produce copious atoms, radicals and ions, and the adjacent passive regions provide time for these atoms, radicals and ions to react with the $NO_x$ before the next active region is encountered by the moving stream of exhaust gas. Because each active region is axially compact, an intense generation of energetic electrons occurs thereat; because each passive region is axially extended, sufficient time is provided for the resulting ions and radicals to react with the $NO_x$ before the next active region is encountered. Accordingly, the energy consumption in relation to the production of $NO_2$ and aldehydes is extremely favorable.

This favorable result can be explained as follows. Since the ion and radical velocity depends on the strength of the electric field, these velocities in the radial direction (transverse to the axial direction) are faster in the active regions than in the passive regions. This velocity gradient in the radial direction, with the help of the spatially alternating electric field, promotes axial mixing of ionized reaction intermediates, resulting in an enhanced reactivity with the $NO_x$ and hydrocarbons. This mixing, in turn, means that the plasma reactor according to the present invention requires much less energy to operate than the prior art plasma reactors to achieve the same level of performance.

In a preferred embodiment, the plasma reactor has a cylindrical geometry, having a plasma reactor wall composed of a dielectric tube. A high voltage (inner) electrode rod is disposed at the concentric center of the dielectric tube. A ground (outer) electrode is connected to ground and is in the form of a wire coarsely wound around the dielectric tube to provide a sequential pattern composed of a series of discretely spaced apart locations. Exhaust gas passes axially along the dielectric tube. An alternating high voltage is applied to the centrally disposed electrode rod, and the ground is connected to the ground electrode.

The efficiency of the plasma reactor according to the present invention to reduce $NO_x$ in automotive exhaust gas is greatly improved over prior art plasma reactors due to:

elimination of unnecessary power consumption which can further contribute to the overall performance of the plasma reactor, leading to the minimum power consumption;

overall mass transfer rate enhancement of ionized reactants due to the passive regions serving as areas for promoting diffusion and mass transfer of these reactants;

spatially oscillatory electric field inducement by the alternate sequence of active and passive regions of the electric field promoting mixing among ionized reactant species, and resulting in an enhanced reaction rate in the plasma reactor; and passive regions of the electric field providing an increased effective capacitance of the dielectric material constituting the plasma wall, tending to increase the input power for a given voltage, and translating to a decrease of the high voltage necessary to obtain a desirable input power.

Accordingly, it is an object of the present invention to provide a plasma reactor having sequentially alternating active and passive electric field regions axially therealong.

This and additional objects, features and advantages of the present invention will become clearer from the following specification of a preferred embodiment.

DESCRIPTION OF THE PREFERRED EMBODIMENT

Figure 6B:
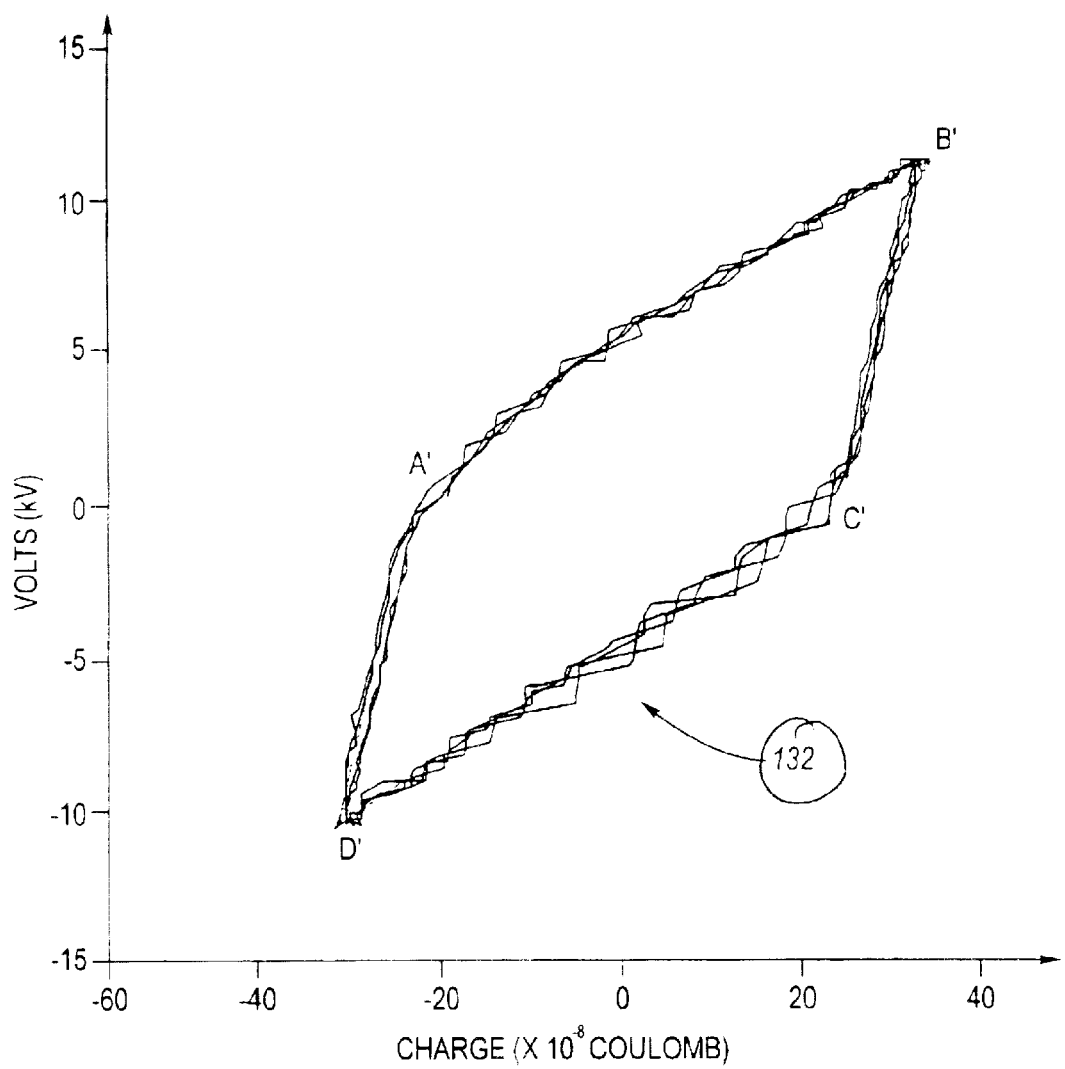
Figure 7:
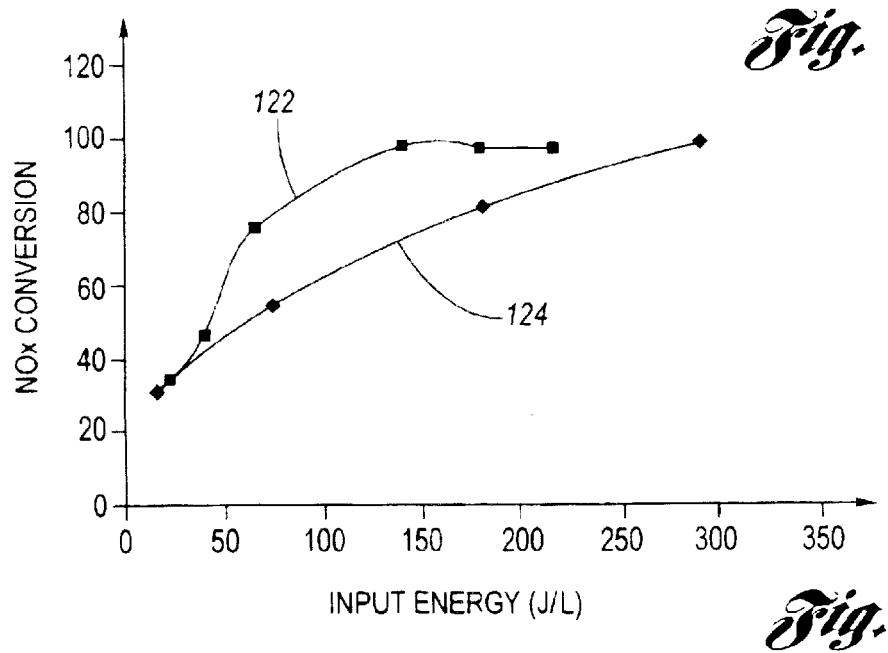
FIG. 7 is a graphical plot of input energy versus $NO_x$ conversion (reduction) for a prior art plasma reactor (FIG. 1B) and a plasma reactor according to the present invention (FIG. 2)
Figure 8:
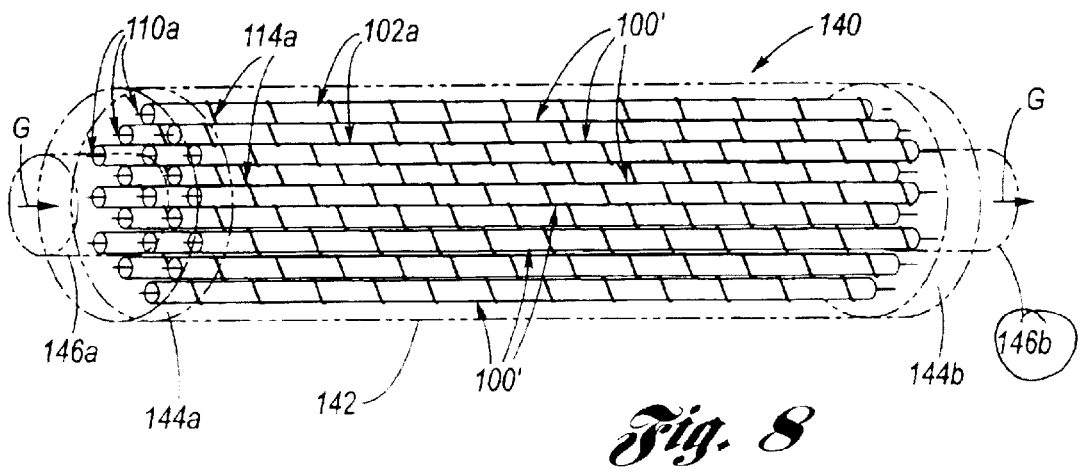
FIG. 8 is a schematic representation of a first form of a commercial plasma reactor according to the present invention.
Figure 9:
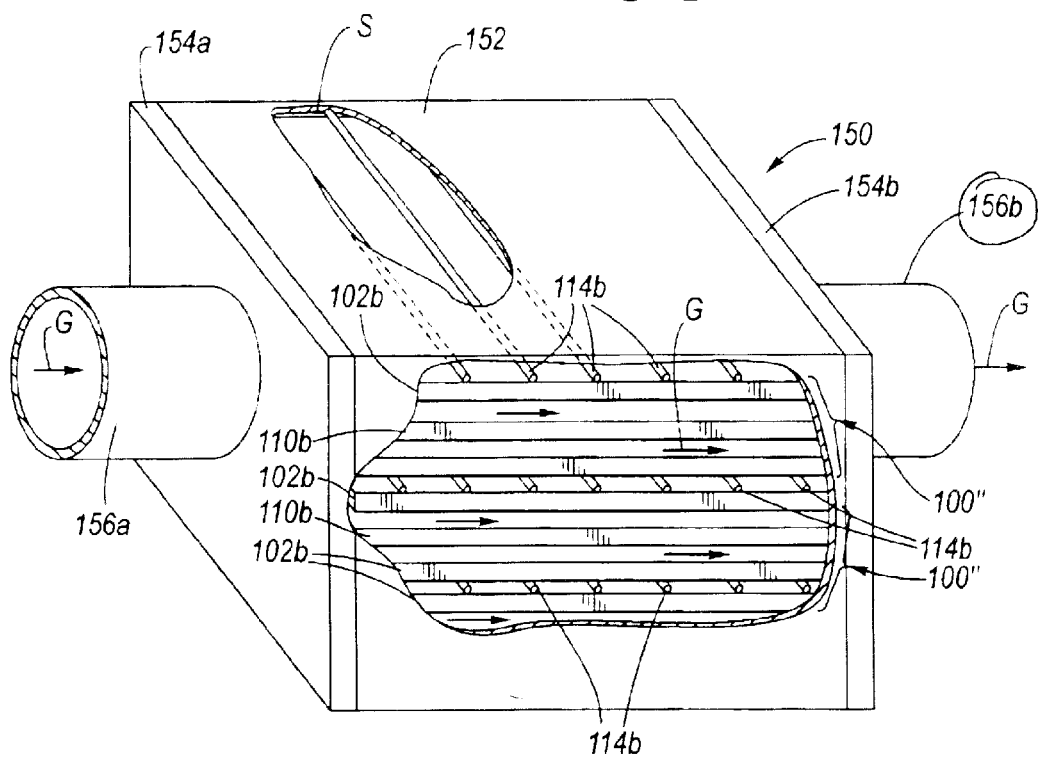
FIG. 9 is a schematic representation of a second form of a commercial plasma reactor according to the present invention.

Referring now to the Drawing, FIGS. 2, 3, 4, 5, 6B and 7 depict various aspects of an example of an automotive exhaust gas plasma reactor 100 according to the present invention, wherein serially alternating regions of active and passive electric field are provided along its axial length; and FIGS. 8 and 9 depict first and second commercial versions of the plasma reactor according to the present invention.

The plasma reactor 100 according to the present invention has an elongated cylindrical configuration defined by a plasma reactor wall 102 composed of an insular dielectric material 102' which serves as a dielectric barrier and defines a reactor space thereinside. The composition of the plasma reactor wall 102 may be any suitable dielectric material, as for example quartz, glass, alumina, etc. By way merely of exemplification and not limitation, the dielectric material may be a quartz tube having a three-eighths inch outside diameter and a wall thickness of 1 mm. Each end of the plasma reactor wall 102 is sealingly closed by a respective end wall 104e, 104e'. An inlet 106 is located at one end of the plasma reactor wall 102, and an outlet 108 is located at the other end of the plasma reactor wall.

A high voltage electrically conductive central (inner) electrode rod 110 is located at the concentric center of the plasma reactor wall 102. The central electrode rod 110 extends at least as long as the plasma wall, preferably being anchored by passage (in sealing relation) through each of the end walls 104e, 104e'. The central electrode rod 110 may be composed of any suitable electrically conductive material, as for example stainless steel, aluminum, copper, etc. By way merely of exemplification and not limitation, the central electrode rod 110 may be composed of stainless steel, having a diameter of one-eighth inch. The central electrode rod 110 is connected to the high voltage output of a time variant high voltage source 112 (see FIG. 4). A dielectric material may cover the central electrode rod, for example for the purpose of environmental protection.

An electrically conductive ground (outer) electrode 114 is in the form of a wire 114' (by "wire" is meant to include all equivalents thereof, as for example narrow, thin electrically conducting film) which is wound tightly (contactingly) around the plasma reactor wall 102, having a selected pitch which provides an axially discrete spacing d. In this regard, the ground electrode is arranged in a sequential pattern comprising a series of discretely spaced apart locations, the sequential pattern being arranged with respect to the axis A along which the exhaust gas G flows. The pitch may be such as to provide coarse spacing (preferred), close spacing, constant spacing (preferred) or variable spacing. The ground electrode 114 is connected to ground of the high voltage source 112. By way merely of exemplification and not limitation, the ground electrode 114 may be composed of small gauge copper/nickel wire coiled tightly around the plasma reactor wall 102.

The outer surface area of the plasma reactor wall 102 which is in local contact with the (wire 114' of the) ground electrode 114 defines an active region 116 of the electric field formed by the voltaic interaction between the electrode rod 110 and the ground electrode, wherein the electric field is moderated by polarization of the dielectric material of the plasma reactor wall 102. The space between the active regions 116 axially along the plasma reactor wall 102 constitute passive regions 118 of the electric field. The active regions 116 of the electric field have higher field intensity than the passive regions 118, wherein the resulting axially varying electric field is represented by the plot 120 of FIG. 5.

Figure 5:
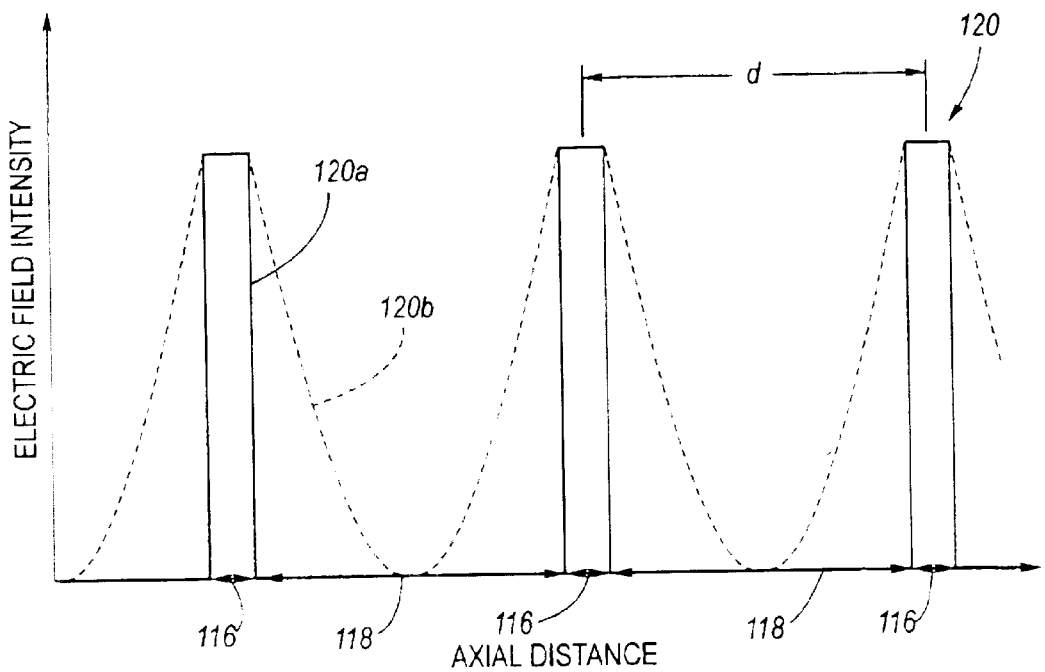
FIG. 5 is a graphical plot of axial distance versus electric field intensity of the plasma reactor according to the present invention.

In FIG. 5, the axial locations 120a of the ground electrode and its associated active region of electric field intensity are shown by the rectangular solid line bars. The nonuniform electric field intensity 120b is shown by the dashed lines. The smooth transition of the nonuniform electric field intensity between the active and passive regions 116, 118 is due to the free drift of high energy electrons from the active regions to the passive regions, which results from the physical nature of the free boundary between the active and passive regions.

In operation of the plasma reactor 100 with respect to automotive exhaust gas G, as the gas passes into the plasma reactor via the inlet 106, a plasma is formed by the voltage across the central electrode rod 110 and the ground electrode 114, moderated by polarization of the dielectric material 102', wherein diffusion, mass transfer and chemical reaction processes of atoms, ions and radicals are promoted because the ground electrode has an axially discrete pattern due to its pitched coiling. In this regard, the pitched coiling provides sequentially alternating short axial distance active regions 116 and long axial distance passive regions 118 of the electric field (see FIGS. 2 and 5). By way of illustration and not limitation, the ratio of the axial distance of an active region in relation to the axial distance of a passive region may be about an order of magnitude. As the exhaust gas G passes axially along the plasma reactor from the inlet 106 to the outlet 108, each encountered active region 116 produces plasma atoms, ions and radicals of the exhaust gas, which then have time to react with the $NO_x$ and hydrocarbons of the exhaust gas over the course of the downstream adjacent passive region 118. In this manner, successive active regions produce copious atoms, radicals and ions, and the adjacent passive regions provide time for these atoms, radicals and ions to react with the $NO_x$ and hydrocarbons before the next active region is encountered by the moving stream of exhaust gas.

It has been determined that optimization of the active and passive regions of the electric field in a plasma reactor 100 according to the present invention can be represented by the relation:

$$d \approx h \cdot \cos(\pi/3), \quad (1)$$

wherein d (as for example shown at FIG. 2) is the distance between the mutually adjoining active and the passive regions (i.e., the axial length of the passive regions), and wherein h (as for example shown at FIG. 3) is the shortest distance between the central electrode rod and the outer ground electrode. The exact value of d depends on the specific kinetics of the chemical reaction occurring in the plasma reactor.

An experiment demonstrating a successful implementation of the plasma reactor 100 was conducted using a simulated engine exhaust gas mixture. Observed was a bright annular region between the central electrode rod and the (quartz tube) dielectric plasma reactor wall, which brightness represented the exhaust gas plasma. On the outer surface of the plasma reactor wall, observed were bright regions adjacent to the spiraling wire of the outer ground electrode, which represented the active regions of the electric field. Also observed on the outer surface of the plasma reactor wall were dark regions between the bright regions, which represented the passive regions of the electric field. Despite this clear distinction between the active and passive regions of the electric field as shown on the outer surface of the (dielectric barrier) plasma reactor wall, the plasma intensity in the annular region was observed to be almost uniform, indicating a good gas phase mixing in the plasma. This result can be explained as follows. Since the ion velocity depends on the strength of the electric field, it is faster in the active regions of the electric field than in the passive regions of the electric field. This, with the help of the spatially alternating electric field, promotes axial mixing of ionized reaction intermediates, resulting in an enhanced reactivity of the $NO_x$.

Figure 1A:
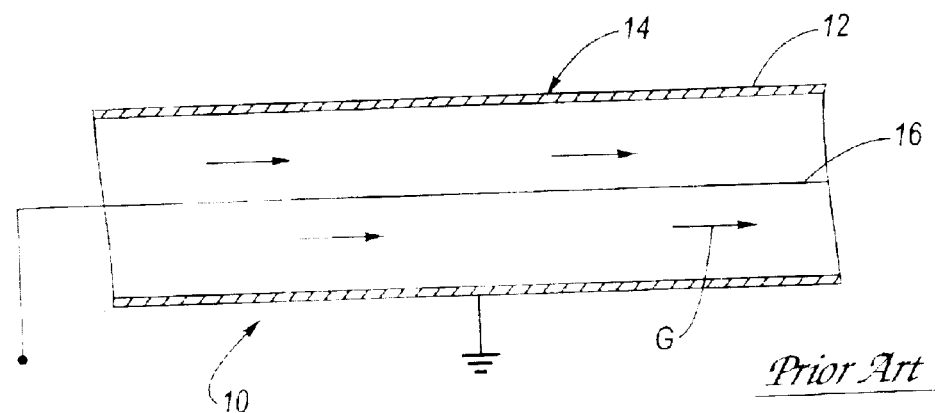
FIGS. 1A through 1C are partly sectional side views of prior art plasma reactors.
Figure 1B:
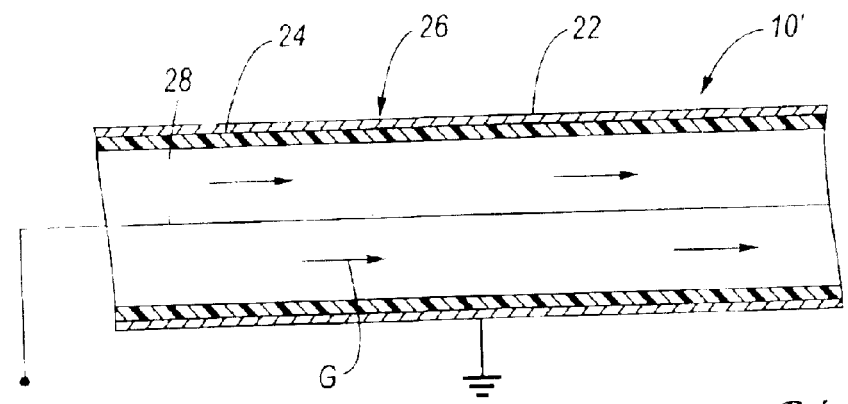
Figure 2:
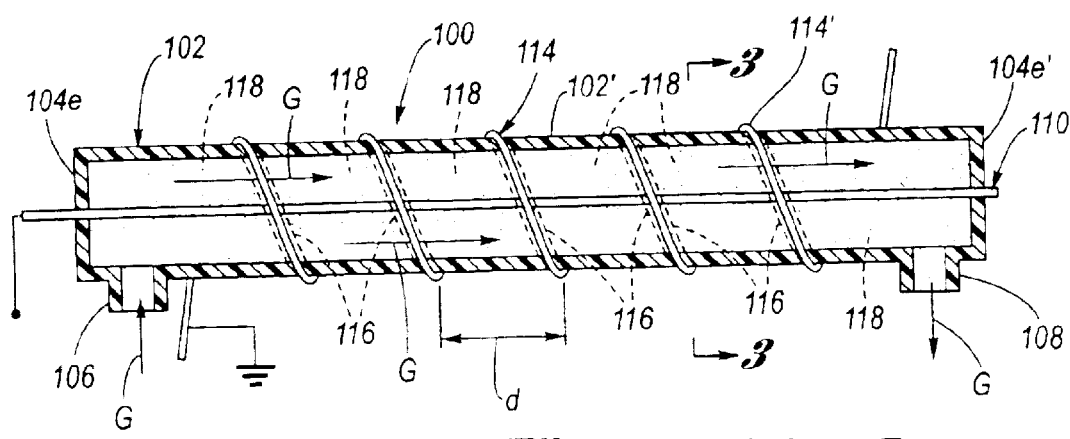
FIG. 2 is a partly sectional side view of a plasma reactor according to the present invention.
Figure 6A:
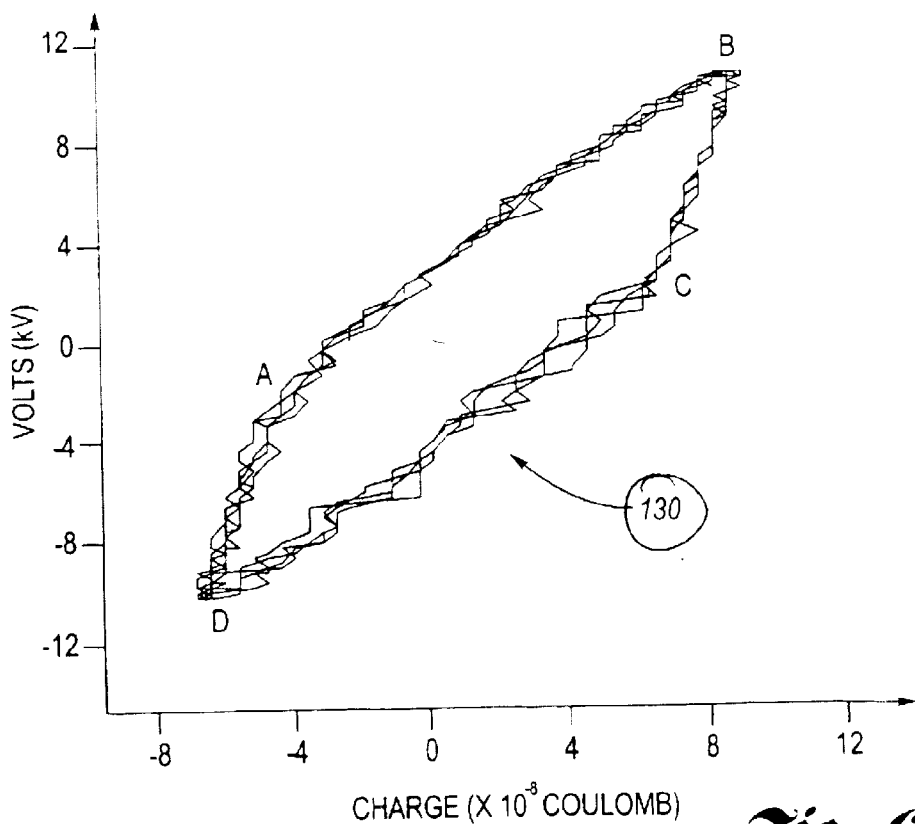
FIGS. 6A and 6B are Lissajous diagrams for a prior art plasma reactor (FIG. 1B) and a plasma reactor according to the present invention (FIG. 2), respectively, which can be used to estimate the effective capacitance of the dielectric barrier respectively thereof.

FIGS. 6A and 6B are Lissajous diagrams 130, 132 for a prior art plasma reactor, as shown at FIG. 1B, and a plasma reactor according to the present invention, as shown at FIG. 2, respectively, which are essentially phase diagrams of voltage vs. charge. In both cases, an AC voltage of +/−10.6 KV in a sine wave was applied to the central electrode at a frequency of 200 Hz. It should be noted that the scale of the x-axis is vastly different between FIGS. 6A and 6B. The nearly perfect parallelograms indicate constant dynamic capacitance, and the slope of line AB, A'B' (or line CD, C'D') correspond to reciprocal capacitance of the dielectric barrier $(1/C_b)$, the same dielectric barrier being used for both plasma reactors. The effective capacitance of the dielectric barrier $(C_b)$ estimated from FIGS. 6A and 6B are: $C_b = 53$ pF for the prior art plasma reactor, and $C_b = 53$ pF for the plasma reactor according to the present invention. It is remarkable that the effective capacitance of the same dielectric barrier can be increased by 530% by the plasma reactor of the present invention, compared to the prior art plasma reactor. The total electrical energy absorbed by the gas plasma (P) was estimated from the area of the parallelogram. The results are: P=0.18 watt for the prior art plasma reactor, and P=1.02 watt for the plasma reactor according to the present invention. Clearly, the plasma reactor of the present invention absorbs the electrical energy much more efficiently than the prior art plasma reactor.

The increase in $C_b$ is of practical significance, because the electrical power absorbed by the gas plasma (P) is proportional to $C_b$ according to the following equation:

$$P = 4f \cdot E_f \cdot C_b \cdot [V_m \cdot E_f (C_g + C_b)/C_b] \qquad (2)$$

wherein, P is the input power (watts), f is the frequency ($s^{-1}$), $E_f$ is the constant voltage drop across the gap when conducting (volts), $V_m$ is the peak voltage (volts), $C_b$ is the dielectric barrier capacitance (Farads), and $C_g$ is the gap capacitance (Farads).

Figure 1C:
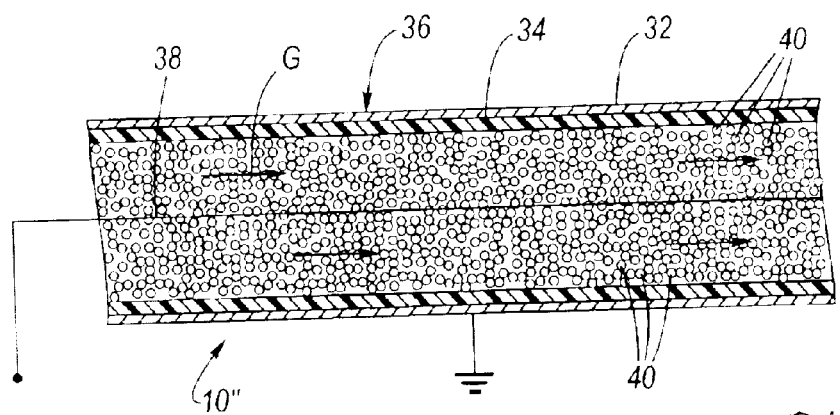

Table 1 compares several performance aspects of plasma reactors of the prior art (FIG. 1C) and of the present invention (FIG. 2) for a high voltage frequency of 200 Hz. The feed gas to the respective plasma reactors contained 225 ppm NO, 600 ppm $C_3H_6$, 12% $O_2$, 2.5% $H_2O$, and the balance $N_2$. Clearly, the present invention is much more efficient in converting hydrocarbons to acetaldehyde ($CH_3CHO$) which is the most active $NO_x$ reductant. Also, the electrical energy is shown to be absorbed more efficiently at lower voltage by the present invention than by the prior art.

TABLE I

| Performance Aspect | Prior Art | Present Invention |
|---|---|---|
| $C_3H_6 \rightarrow CH_3CHO$ | 11% | 20% |
| $NO \rightarrow NO_2$ | 100% | 100% |
| $C_3H_6$ conversion | 25% | 60% |
| Peak voltage used | 9 kV | 5.5 kV |
| Energy (E) absorbed | 15 J/L | 20 J/L |

FIG. 7 demonstrates the improved performance of the plasma reactor 100 with respect to $NO_x$ reduction (conversion), plot 122, as compared with a prior art plasma reactor having a continuous outer ground electrode (FIG. 1B), plot 124. A simulated exhaust gas mixture containing 75 ppm NO, 200 ppm $C_3H_6$, 12% $O_2$, 2.5% $H_2O$ and balance $N_2$ was fed first to the plasma reactor and then to the catalytic reactor containing Na/zeolite Y catalysts. Both plasma reactors were at 25 C and subjected to an AC voltage in a sine wave with amplitude of 10.6 KV and frequency of 200 Hz. The temperature of the catalytic reactor was kept at 180 C. Clearly, the plasma reactor according to the present invention performs much better than that of the prior art plasma reactor for the same input energy to the plasma, when used in series with a Na/zeolite Y catalyst. Accordingly, the plasma reactor 100 according to the present invention advantageously requires much less energy than a prior art plasma reactor to achieve the same performance of the plasma assisted $NO_x$ reduction (conversion). Additionally, the plasma reactor according to the present invention is more stable and durable over a wide range of over-voltages than prior art plasma reactors.

For commercial implementation of the plasma reactor 100 a multi-unit, juxtaposed construction, similar to a typical heat exchanger design, would be advantageous.

Figure 3:
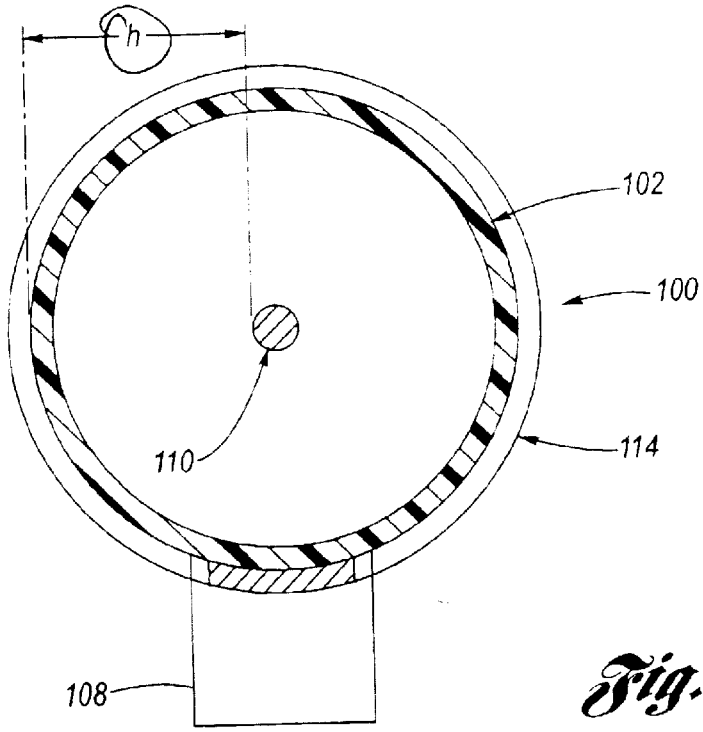
FIG. 3 is a sectional end view, seen along line 3—3 of FIG. 2.
Figure 4:
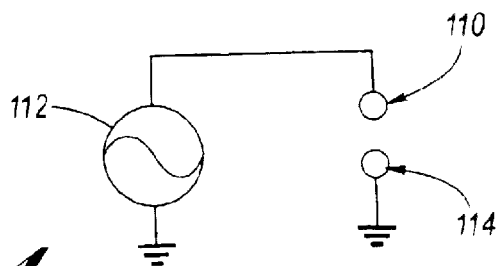
FIG. 4 is a schematic diagram of an electrical circuit for the plasma reactor according to the present invention.

In a first commercial form of commercial plasma reactor 140 according to the present invention, shown at FIG. 8, a plurality of juxtaposed cylindrical plasma reactors 100', each having a cylindrical dielectric plasma reactor wall 102a forming a reactor space thereinside, a centrally disposed high voltage central electrode rod 110a and an outer coiled wire ground electrode 114a, as structurally and operatively recounted hereinabove with respect to FIGS. 2 through 4. With regard to the circuit of FIG. 4, the central electrode rods 110a are all wired together in parallel, and the ground electrodes 114a are also all wired together in parallel. A cylindrical chamber 142 contains the plurality of plasma reactors 100', each spaced apart and supported at each end by entry and exit end chambers 144a, 144b. An entry pipe 146a provides exhaust gas G entry into the entry end chamber 144a, which, in turn, effects communication between the entry pipe and the plurality of plasma reactors 100'. An exit pipe 146b (which connects to the vehicle's catalytic converter, see FIG. 10 ) provides exiting of the exhaust gas G from the plurality of plasma reactors 100', wherein the exit end chamber 144b effects communication between the exit pipe and the plurality of plasma reactors. The exhaust gas travels only inside the plasma reactors between the entry and exit end caps.

In a second commercial form of commercial plasma reactor 150 according to the present invention, shown at FIG. 9, a stack of juxtaposed rectangular plasma reactors 100" are located within a rectangular chamber 152. Each plasma reactor 100" has a dielectric plasma reactor wall 102b in the form of two superposed, mutually parallel and spaced apart flat dielectric sheets defining a reactor space therebetween, a centrally disposed (inner) high voltage electrode sheet 110b (also flat), and an outer ground electrode 114b composed of wire in the form of a series of mutually interconnected (using for example an end shunt S, or a zig-zag arrangement), and mutually spaced apart, wire segments laying across the plasma reactor wall transversely or obliquely in relation to the axial direction. Mutually adjacent plasma reactors 100" may share the ground electrode 114b. The electrodes are wired as indicated in FIG. 4, wherein the electrode sheets 110b are all wired together in parallel, and the ground electrodes 114b are also all wired together in parallel. The flat sheets (dielectric plasma reactor wall 102b and central electrode 110b) are supported at each end by entry and exit end chambers 154a, 154b. An entry pipe 156a provides exhaust gas G entry into the entry end chamber 154a, which, in turn, effects communication between the entry pipe and the plurality of plasma reactors 100". An exit pipe 156b (which connects to the vehicle's catalytic converter, see FIG. 10) provides exiting of the exhaust gas G from the plurality of plasma reactors 100", wherein the exit end chamber 154b effects communication between the exit pipe and the plurality of plasma reactors. The exhaust gas travels only inside the plasma reactors between the entry and exit end caps. The electrode sheets 110b may be covered by a dielectric material for example for the purpose of environmental protection.

Figure 10:
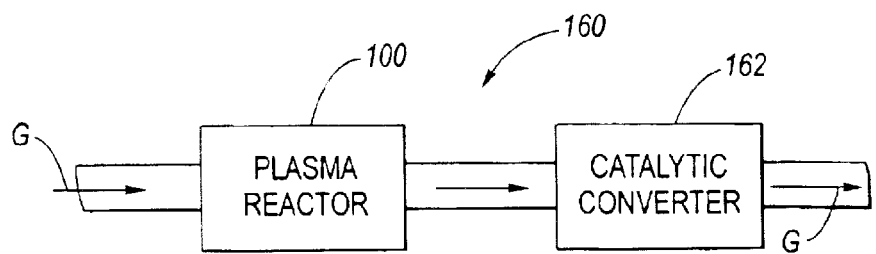
FIG. 10 is an exhaust gas treatment system composed of the plasma reactor according to the present invention and a catalytic converter.

FIG. 10 depicts schematically an exhaust gas treatment system 160 composed of a plasma reactor 100 upstream of a catalytic converter 162. After treatment of the exhaust gas G by the plasma reactor 100, the catalytic converter 162 further treats the exhaust gas. A catalyst, as for example NaY, is in the catalytic converter.

To those skilled in the art to which this invention appertains, the above described preferred embodiment may be subject to change or modification. For example, the plasma reactor wall may have any suitable geometry. Such change or modification can be carried out without departing from the scope of the invention, which is intended to be limited only by the scope of the appended claims.

What is claimed is:

1. A plasma reactor for making $NO_2$ from NO and aldehydes from hydrocarbons in automotive exhaust gas, comprising:
   a dielectric plasma reactor wall, said dielectric plasma reactor wall defining a reactor space;
   an inner electrode disposed within said reactor space in parallel relation to said dielectric plasma reactor wall; and
   an outer electrode adjoining said dielectric plasma reactor wall, said outer electrode being arranged in a sequential pattern comprising a series of discretely spaced apart locations, said sequential pattern arrangement consisting of one dimension.

2. The plasma reactor of claim 1, further comprising a source of time varying high voltage connected to one of said inner and outer electrodes.

3. The plasma reactor of claim 1, wherein said outer electrode is comprised of electrically conductive wire.

4. The plasma reactor of claim 3, wherein said inner electrode is disposed substantially centrally and coextensively with respect to said dielectric plasma reactor wall.

5. The plasma reactor of claim 4, further comprising a source of time varying high voltage connected to said inner and outer electrodes; wherein said source provides, with respect to one of said inner and outer electrodes and said dielectric plasma reactor wall, sequentially alternating regions of active and passive electric field in a direction along said dielectric plasma reactor wall parallel to the axis.

6. The plasma reactor of claim 5, wherein each said region of active electric field has an active distance parallel to the axis which is shorter than a passive distance parallel to the axis of any said passive region of electric field, substantially defined by a relation:

$$d \approx h \cdot \cos(\pi/3),$$

wherein d is a length of the regions of passive electric field parallel to the axis, and wherein h is a shortest distance between said inner electrode rod and said outer electrode.

7. The plasma reactor of claim 6, wherein said sequentially alternating regions of active and passive electric field provide an effective capacitance of said plasma reactor which exceeds an intrinsic capacitance of said plasma reactor.

8. The plasma reactor of claim 7, wherein said dielectric plasma reactor wall has a cylindrical geometry, and wherein said wire is wound spirally with respect to the axis around said dielectric plasma reactor wall.

9. The plasma reactor of claim 7, wherein said dielectric plasma reactor wall comprises a pair of superposed, mutually parallel and spaced apart flat dielectric sheets, wherein said inner electrode comprises a flat conductive sheet medially positioned between the flat dielectric sheets, and wherein said wire comprises a plurality of mutually spaced apart and shunted wire segments adjoining each of the flat dielectric sheets, the wire segments being arranged at an orientation selected from the group consisting of: transversely with respect to the axis and obliquely with respect to the axis.

10. A multi-unit plasma reactor for reducing nitrogen oxides in automotive exhaust gas, comprising:
    a plurality of mutually juxtaposed plasma reactors, each plasma reactor comprising:
       a dielectric plasma reactor wall, said dielectric plasma reactor wall defining a reactor space;
       an inner electrode disposed within said reactor space in parallel relation to said plasma reactor wall; and
       an outer electrode adjoining said plasma reactor wall, said outer electrode being arranged in a sequential pattern comprising a series of discretely spaced apart locations, said sequential pattern being arranged with respect to an axis.

11. The plasma reactor of claim 10, wherein each said plasma reactor further comprises:
    said dielectric plasma reactor wall having a cylindrical geometry; and
    said outer electrode comprising wire wound spirally with respect to the axis around said dielectric plasma reactor wall.

12. The plasma reactor of claim 10, wherein each said plasma reactor further comprises:
    said dielectric plasma reactor wall comprising a pair of superposed, mutually parallel and spaced apart flat dielectric sheets;
    said inner electrode comprising a flat conductive sheet medially positioned between the flat dielectric sheets; and
    said outer electrode comprising a plurality of mutually spaced apart and shunted wire segments adjoining each of the flat dielectric sheets, the wire segments being arranged at an orientation selected from the group consisting of: transversely with respect to the axis and obliquely with respect to the axis.

13. A treatment system for automotive exhaust gas, comprising:
    at least one plasma reactor comprising:
       a dielectric plasma reactor wall forming a reactor space, said dielectric plasma reactor wall having an inlet and an outlet for exhaust gas entry and exit, respectively, with regard to said reactor space;
       an inner electrode disposed within said reactor space in parallel relation to said dielectric plasma reactor wall; and
       an outer electrode adjoining said plasma reactor wall, said outer electrode being arranged in a sequential pattern comprising a series of discretely spaced apart locations, said sequential pattern being arranged with respect to an axis; and
    a catalytic converter connected to said outlet of said at least one plasma reactor.

14. The treatment system of claim 13, wherein said at least one plasma reactor comprises a plurality of mutually juxtaposed said plasma reactors.

15. The treatment system of claim 14, wherein each said plasma reactor further comprises:
    said dielectric plasma reactor wall having a cylindrical geometry; and
    said outer electrode comprising wire wound spirally with respect to the axis around said dielectric plasma reactor wall.

16. The treatment system of claim 14, wherein each said plasma reactor further comprises:
    said dielectric plasma reactor wall comprising a pair of superposed, mutually parallel and spaced apart flat dielectric sheets;
    said inner electrode comprising a flat conductive sheet medially positioned between the flat dielectric sheets; and
    said outer electrode comprising a plurality of mutually spaced apart and shunted wire segments adjoining each of the flat dielectric sheets, the wire segments being arranged at an orientation selected from the group consisting of: transversely with respect to the axis and obliquely with respect to the axis.

17. A method for reducing nitrogen oxides from automotive exhaust gas having hydrocarbons, comprising the steps of:

providing a stream of exhaust gas moving generally parallel with respect to an axis;

subjecting the gas to a region of high voltage extending for a short distance parallel to the axis;

subjecting the gas immediately thereafter to voltage lower than said high voltage for a long distance parallel to the axis; and sequentially repeating a selected number of times said first and second steps of subjecting;

wherein atoms, radicals and ions are produced in the gas by the first step of subjecting, and wherein nitrogen oxides in the gas is reduced by interaction of the nitrogen oxides with the atoms, ions and radicals during said second step of subjecting.

18. The method of claim 17, wherein said second step of subjecting comprises NO of the nitrogen oxides in the exhaust gas oxidizing into $NO_2$; and the hydrocarbons oxidizing into aldehydes by interaction with the atoms, ions and radicals.

* * * * *